(12) United States Patent
Oniwa

(10) Patent No.: US 12,233,873 B2
(45) Date of Patent: Feb. 25, 2025

(54) CONTROL DEVICE

(71) Applicant: HONDA MOTOR CO., LTD., Tokyo (JP)

(72) Inventor: Yoshihiro Oniwa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 18/073,072

(22) Filed: Dec. 1, 2022

(65) Prior Publication Data
US 2023/0174070 A1    Jun. 8, 2023

(30) Foreign Application Priority Data

Dec. 3, 2021  (JP) ................................. 2021-196993

(51) Int. Cl.
*B60W 30/12*    (2020.01)
*B60Q 1/34*    (2006.01)
(Continued)

(52) U.S. Cl.
CPC ......... *B60W 30/18163* (2013.01); *B60Q 1/34* (2013.01); *B60W 30/12* (2013.01);
(Continued)

(58) Field of Classification Search
CPC .......... B60W 30/12; B60W 30/18163; B60W 30/182; B60W 40/04; B60W 50/10;
(Continued)

(56) References Cited

U.S. PATENT DOCUMENTS

2016/0082971 A1 * 3/2016 Fuehrer ........... B60W 30/18145
701/48
2016/0311464 A1    10/2016 Yamaoka
(Continued)

FOREIGN PATENT DOCUMENTS

JP    2016-207060 A    12/2016
JP    2018-103767 A    7/2018
(Continued)

OTHER PUBLICATIONS

Jul. 11, 2023, Translation of Japanese Office Action issued for related JP Application No. 2021-196993.
(Continued)

*Primary Examiner* — Erick R Solis
(74) *Attorney, Agent, or Firm* — Paratus Law Group, PLLC

(57) ABSTRACT

A control device for performing a travel control of a vehicle includes: a lane change intention detection unit configured to detect an intention of a driver to change a lane based on a predetermined operation on an operation device by the driver; and a travel control unit configured to determine whether a lane change of the vehicle is possible based on a surrounding situation, and to control the lane change based on a detection result of the lane change intention detection unit and a determination result of whether the lane change is possible. The travel control unit is configured to determine a start timing of a lateral movement in the lane change based on an operation on the operation device when the lane change is possible after the intention of the driver to change the lane is detected.

6 Claims, 12 Drawing Sheets

(51) Int. Cl.
  *B60W 30/18* (2012.01)
  *B60W 30/182* (2020.01)
  *B60W 40/04* (2006.01)
  *B60W 50/10* (2012.01)
  *B60W 50/12* (2012.01)
  *B60W 50/14* (2020.01)
  *B60W 50/00* (2006.01)

(52) U.S. Cl.
  CPC .......... *B60W 30/182* (2013.01); *B60W 40/04* (2013.01); *B60W 50/10* (2013.01); *B60W 50/12* (2013.01); *B60W 50/14* (2013.01); B60W 2050/0083 (2013.01); B60W 2050/143 (2013.01); B60W 2050/146 (2013.01); B60W 2540/20 (2013.01)

(58) Field of Classification Search
  CPC ................ B60W 50/12; B60W 50/14; B60W 2050/143; B60W 2050/146; B60W 2540/20
  USPC ............................................................ 701/41
  See application file for complete search history.

(56) References Cited

U.S. PATENT DOCUMENTS

| | | |
|---|---|---|
| 2018/0178714 A1 | 6/2018 | Fujii |
| 2019/0047469 A1 | 2/2019 | Nishiguchi et al. |
| 2019/0047561 A1 | 2/2019 | Nishiguchi et al. |
| 2020/0247416 A1 | 8/2020 | Tsuji et al. |
| 2021/0284162 A1* | 9/2021 | Parks .................. G05D 1/0212 |
| 2021/0402998 A1* | 12/2021 | Inoue .................... B60W 10/18 |
| 2023/0028132 A1* | 1/2023 | Takahashi ............. B60W 40/08 |
| 2024/0239346 A1* | 7/2024 | Gutbrod ................ B60W 30/12 |

FOREIGN PATENT DOCUMENTS

| | | |
|---|---|---|
| JP | 2019-034622 A | 3/2019 |
| JP | 2019-036086 A | 3/2019 |
| JP | 2020-125028 A | 8/2020 |

OTHER PUBLICATIONS

Dec. 19, 2023, Translation of Japanese Office Action issued for related JP Application No. 2021-196993.

* cited by examiner

CONTROL DEVICE

CROSS REFERENCE TO RELATED APPLICATIONS

This application claims priority to Japanese Patent Application No. 2021-196993 filed on Dec. 3, 2021, the contents of which are incorporated herein by reference.

TECHNICAL FIELD

The present invention relates to a control device.

BACKGROUND ART

In recent years, as a specific measure against global climate change, efforts are being made to realize a low-carbon society or a decarbonized society. Also in vehicles, reduction in $CO_2$ emission is strongly required, and introduction of automatic driving and driving assistance of the vehicles that contribute to improvement in fuel efficiency is rapidly progressing. As a technique of automatic driving and driving assistance of a vehicle, an auto lane changing (ALC) technique has been developed in which a vehicle changes lanes without a driver performing an operation such as steering.

JP2018-103767A describes a lane changing assistance device that starts a lane changing assistance control when a duration time during which a turn signal lever is held at a first operation position is equal to or longer than an assistance request confirmation time.

JP2019-036086A describes a vehicle control system that determines a start timing of a lane change based on whether a predetermined time has elapsed after an intention to change a lane is detected, or whether a vehicle has traveled a predetermined distance.

JP2016-207060A describes a lane changing assistance device that starts lane changing assistance after lapse of a preset margin time when a turning-on operation of a direction indicator on an adjacent lane side is performed, and starts the lane changing assistance before the lapse of the margin time when it is determined that a steering amount becomes equal to or greater than a steering amount threshold value during the margin time.

However, in the related art, there is a room for improvement in an operation for starting the lane change at any timing by a driver.

For example, in a vehicle control system of JP2018-103767A, in order to start a lane change at any timing of a driver, it is necessary to perform an uneasy operation of first performing a turning-on operation of a direction indicator on an adjacent lane side by a direction indicator lever and then performing a large steering by a steering wheel at any timing during a margin time.

An object of the present invention is to provide a control device capable of facilitating an operation for starting a lane change at any timing by a driver.

SUMMARY OF INVENTION

According to an aspect of the present invention, there is provided a control device for performing a travel control of a vehicle, the control device includes: a lane change intention detection unit configured to detect an intention of a driver to change a lane based on a predetermined operation on an operation device by the driver; and a travel control unit configured to determine whether a lane change of the vehicle is possible based on a surrounding situation recognized by a recognition unit configured to recognize the surrounding situation of the vehicle, and to control the lane change of the vehicle based on a detection result of the lane change intention detection unit and a determination result of whether the lane change of the vehicle is possible. The travel control unit is configured to determine a start timing of a lateral movement in the lane change of the vehicle based on an operation on the operation device by the driver when the lane change of the vehicle is possible after the intention of the driver to change the lane is detected.

DESCRIPTION OF EMBODIMENTS

Hereinafter, an embodiment of the present invention will be described with reference to the drawings.

Overall Configuration of Vehicle System 1

Figure 1:
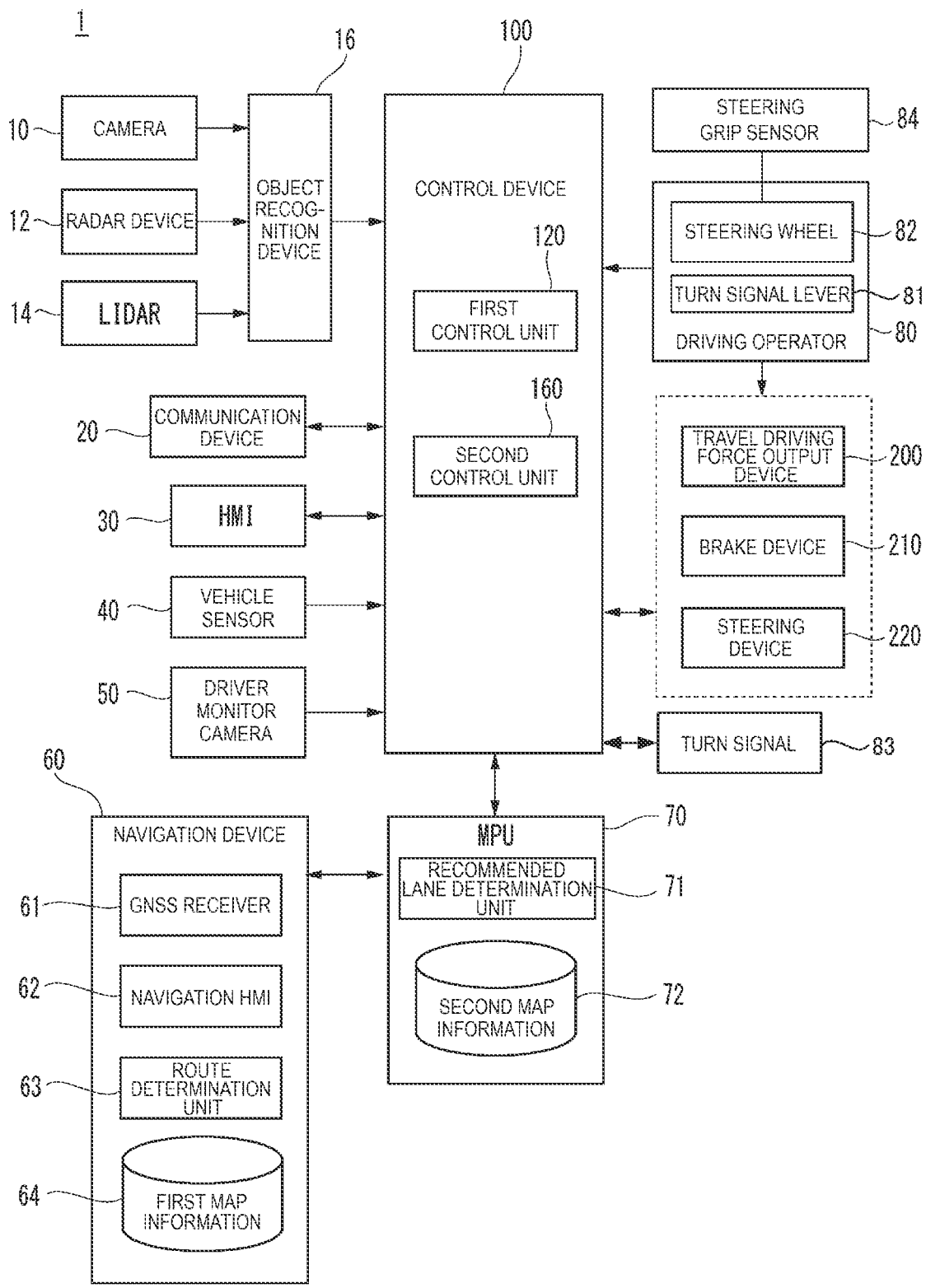
FIG. 1 is a block diagram illustrating an overall configuration of a vehicle system 1 equipped with a control device according to an embodiment.

FIG. 1 is a block diagram illustrating an overall configuration of a vehicle system 1 equipped with a control device according to an embodiment. A vehicle on which the vehicle system 1 is mounted (hereinafter, referred to as a host vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a driver monitor camera 50, a navigation device 60, a map positioning unit (MPU) 70, a driving operation device 80, a turn signal 83, a control device 100, a travel driving force output device 200, a brake device 210, and a steering device 220. These devices and equipment are connected to one another by a multiplex communication line such as a controller area network (CAN) communication line, a serial communication line, a wireless communication network, or the like.

The camera 10 is, for example, a digital camera that uses a solid-state image capturing element such as a charge coupled device (CCD) or a complementary metal oxide semiconductor (CMOS). The camera 10 is attached to any portion of the host vehicle M on which the vehicle system 1 is mounted.

The radar device 12 emits radio waves such as millimeter waves to a vicinity of the host vehicle M, and detects at least a position (distance and direction) of an object by detecting radio waves (reflected waves) reflected by the object. The radar device 12 is attached to any portion of the host vehicle M.

The LIDAR 14 emits light (or an electromagnetic wave having a wavelength close to that of light) to the vicinity of the host vehicle M and measures scattered light. The LIDAR 14 detects a distance to a target based on a time from light emission to light reception. The emitted light is, for example, pulsed laser beam. The LIDAR 14 is attached to any portion of the host vehicle M.

The object recognition device 16 performs a sensor fusion process on some or all detection results of the camera 10, the radar device 12, and the LIDAR 14 to recognize a position, a type, a speed, and the like of an object. The object recognition device 16 outputs a recognition result to the control device 100. The object recognition device 16 may output the detection results of the camera 10, the radar device 12, and the LIDAR 14 to the control device 100 as they are.

The communication device 20 communicates with other vehicles present in the vicinity of the host vehicle M by using, for example, a cellular network, a Wi-Fi (registered trademark) network, a Bluetooth (registered trademark), dedicated short range communication (DSRC), or the like, and communicates with various server devices via a wireless base station.

The HMI 30 presents various types of information to an occupant of the host vehicle M and accepts an input operation by the occupant. The HMI 30 includes various display devices, a speaker, a buzzer, a touch panel, a switch, a key, and the like.

The vehicle sensor 40 includes a vehicle speed sensor that detects a speed of the host vehicle M, an acceleration sensor that detects an acceleration, a yaw rate sensor that detects an angular velocity around a vertical axis, a direction sensor that detects a direction of the host vehicle M, and the like.

The driver monitor camera 50 is, for example, a digital camera using a solid-state image capturing element such as a CCD or a CMOS. The driver monitor camera 50 is attached to any portion in the host vehicle M at a position and in a direction where an image of a head of the occupant (hereinafter, referred to as a driver) seated in a driver's seat of the host vehicle M can be captured from the front (in a direction in which an image of a face thereof is captured).

The navigation device 60 includes, for example, a global navigation satellite system (GNSS) receiver 61, a navigation HMI 62, and a route determination unit 63. The navigation device 60 stores first map information 64 in a storage device such as a hard disk drive (HDD) or a flash memory.

The GNSS receiver 61 specifies a position of the host vehicle M based on a signal received from a GNSS satellite. The position of the host vehicle M may be specified or complemented by an inertial navigation system (INS) using the output of the vehicle sensor 40.

The navigation HMI 62 includes a display device, a speaker, a touch panel, a key, and the like. The navigation HMI 62 may be partially or entirely shared with the HMI 30 described above.

For example, the route determination unit 63 determines a route (hereinafter, referred to as a route on a map) from the position of the host vehicle M specified by the GNSS receiver 61 (or input any position) to a destination input by the occupant using the navigation HMI 62 with reference to the first map information 64. The first map information 64 is, for example, information in which a road shape is expressed by a link indicating a road and a node connected by the links. The first map information 64 may include a curvature of a road, point of interest (POI) information, and the like. The route on the map is output to the MPU 70.

The navigation device 60 may perform route guidance using the navigation HMI 62 based on the route on the map. The navigation device 60 may transmit a current position and the destination to a navigation seller via the communication device 20 and acquire a route equivalent to the route on the map from the navigation server.

The MPU 70 includes, for example, a recommended lane determination unit 71, and stores second map information 72 in a storage device such as an HDD or a flash memory. The recommended lane determination unit 71 divides the route on the map provided from the navigation device 60 into a plurality of blocks (tier example, divides the route on the map every 100 [m] in a vehicle traveling direction), and determines a recommended lane for each block with reference to the second map information 72. For example, the recommended lane determination unit 71 determines which lane from the left the vehicle travels in. When there is a branch point on the route on the map, the recommended lane determination unit 71 determines a recommended lane such that the host vehicle M can travel on a reasonable route for proceeding to a branch destination.

The second map information 72 is map information with higher accuracy than the first map information 64. The second map information 72 includes, for example, information on a center of the lane, information on a boundary of the lane, or the like. In addition, the second map information 72 may include road information, traffic regulation information, address information, facility information, telephone number information, and the like. The second map information 72 may be updated as needed by the communication device 20 communicating with another device.

The driving operation device 80 includes, for example, an accelerator pedal, a brake pedal, a shift lever, and other operation devices in addition to the turn signal lever 81 and the steering wheel 82. A sensor that detects an operation amount or presence or absence of an operation is attached to the driving operation device 80, and a detection result thereof is output to the control device 100 or some or all of the travel driving force output device 200, the brake device 210, and the steering device 220.

The turn signal lever 81 is an operation device for turning on or off the turn signal 83. In addition, the turn signal lever 81 is an example of an operation device for the driver to cause the control device 100 to detect an intention to change a lane.

The turn signal 83 is a direction indicator provided at a position where the turn signal 83 is visible from the outside of the host vehicle M on each of a left side (for example, the left front and the left rear) and a right side (for example, the right front and the right rear) of the host vehicle M. The turn signal 83 is turned on or off in accordance with an operation of the turn signal lever 81.

The steering wheel 82 does not necessarily have to be annular, and may be in the form of irregular steering, a joystick, a button, or the like. A steering grip sensor 84 is attached to the steering wheel 82. The steering grip sensor 84 is realized by a capacitance sensor or the like, and outputs, to the control device 100, a signal capable of detecting whether the driver grips the steering wheel 82.

The control device 100 includes a first control unit 120 and a second control unit 160. Each of the first control unit 120 and the second control unit 160 is realized, for example, by a hardware processor such as a central processing unit (CPU) executing a program (software). Further, some or all of these constituent elements may be implemented by hardware (circuit part: including circuitry) such as large scale integration (LSI), an application specific integrated circuit (ASIC), a field-programmable gate array (FPGA), or a graphics processing unit (GPU), or may be implemented by cooperation of software and the hardware. The program may be stored in advance in a storage device such as an HDD or a flash memory of the control device 100.

Configurations of First Control Unit 120 and Second Control Unit 160

Figure 2:
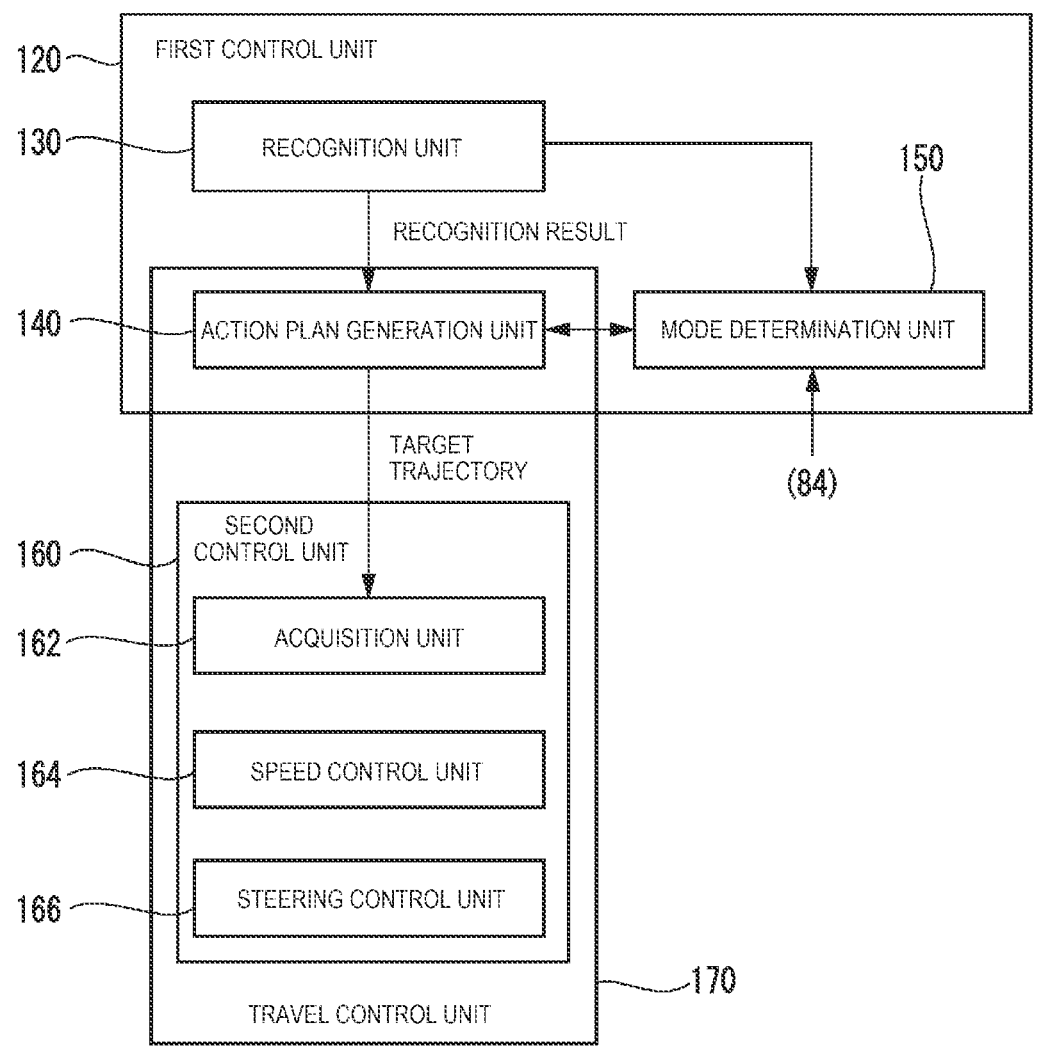
FIG. 2 is a diagram illustrating an example of a configuration of a first control unit 120 and a second control unit 160.

FIG. 2 is a diagram illustrating an example of a configuration of the first control unit 120 and the second control unit 160. The first control unit 120 includes, for example, a recognition unit 130, an action plan generation unit 140, and a mode determination unit 150. The first control unit 120 implements, for example, a function based on artificial intelligence (AI) and a function based on a model given in advance in parallel.

For example, a function of "recognizing an intersection" may be realized by executing recognition of an intersection by deep learning or the like and recognition based on a condition given in advance (there is a signal, a road sign, or the like that can be subjected to pattern matching) in parallel, scoring both of them, and comprehensively evaluating them. As a result, reliability of automatic driving is ensured.

The recognition unit 130 recognizes a surrounding situation of the host vehicle M based on information input from the camera 10, the radar device 12, and the LIDAR 14 via the object recognition device 16. Specifically, the recognition unit 130 recognizes a position of an object in the vicinity of the host vehicle M and a traveling state such as a speed and an acceleration of the object. The position of the object is recognized as, for example, a position on absolute coordinates with a representative point (a center of gravity, a drive axis center, or the like) of the host vehicle M as an origin, and is used for control. The position of the object may be represented by a representative point such as a center of gravity or a corner of the object, or may be represented by an area. The "state" of the object may include an acceleration, a jerk, or an "action state" of the object (for example, whether the object is changing a lane or is about to change the lane).

For example, the recognition unit 130 recognizes a traveling environment in which the host vehicle M is traveling. For example, the recognition unit 130 recognizes a traveling lane of the host vehicle M by comparing a pattern of road marking lines (for example, an array of solid lines and broken lines) obtained from the second map information 72 with a pattern of road marking lines around the host vehicle M recognized from an image captured by the camera 10. The recognition unit 130 may recognize the traveling lane by recognizing a traveling road boundary (road boundary) including a road marking line, a road shoulder, a curb, a median strip, a guardrail, and the like, not limited to the road marking line. In this recognition, the position of the host vehicle M acquired from the navigation device 60 or a processing result by the INS may be added. In addition, the recognition unit 130 recognizes a temporary stop line, an obstacle, a red light, a toll gate, and other road events.

When recognizing the traveling lane, the recognition unit 130 recognizes a position and an orientation of the host vehicle M with respect to the traveling lane. For example, the recognition unit 130 may recognize, as a relative position and orientation of the host vehicle M with respect to the traveling lane, a deviation of a reference point of the host vehicle M from a center of the lane and an angle formed between the traveling direction of the host vehicle M and a line connecting the center of the lane in the traveling direction of the host vehicle M. Alternatively, the recognition unit 130 may recognize, as the relative position of the host vehicle M with respect to the traveling lane, a position of the reference point of the host vehicle M with respect to any side end portion (a road marking line or a road boundary) of the traveling lane or the like.

In principle, the action plan generation unit 140 generates a target trajectory along which the host vehicle M will travel in the future automatically (without depending on an operation of the driver) so that the host vehicle M travels along the recommended lane determined by the recommended lane determination unit 71 and can cope with the surrounding situation of the host vehicle M. The target trajectory includes, for example, a speed element. For example, the target trajectory is expressed by arranging points (trajectory points) to which the host vehicle M is to arrive in order. The trajectory point is a point where the host vehicle M is to arrive for each predetermined traveling distance (for example, about several [m]) at a road distance, and separately, a target speed and a target acceleration for each predetermined sampling time (for example, about several tenths of a second [sec]) are generated as a part of the target trajectory. In addition, the trajectory point may be a position at which the host vehicle M is to arrive at a sampling time point for each predetermined sampling time. In this case, the information on the target speed and the target acceleration is expressed by an interval between the trajectory points.

When generating the target trajectory, the action plan generation unit 140 may set an event of the automatic driving. Examples of the event of the automatic driving include a constant speed traveling event, a low speed following traveling event, a lane changing event, a branching event, a merging event, a takeover event, and the like. The action plan generation unit 140 generates a target trajectory in accordance with an activated event.

The mode determination unit 150 determines the driving mode of the host vehicle M to be any one of a plurality of driving modes in which tasks imposed on the driver are different. In addition, when a task of the determined driving mode (hereinafter, referred to as a current driving mode) is not executed by the driver, the mode determination unit 150 changes the driving mode of the host vehicle M to a driving mode in which the task is more severe. The mode determination unit 150 is an example of a control state setting unit that selects and sets an automation mode of a control of at least one of the traveling speed and the steering of the host vehicle M from among the plurality of driving modes.

Specific Example of Driving Mode

Figure 3:
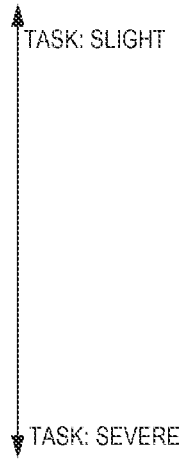
FIG. 3 is a diagram illustrating a specific example of driving modes.

FIG. 3 is a diagram illustrating a specific example of the driving modes. The driving modes of the host vehicle M include, for example, five modes of a first driving mode to a fifth driving mode. The control state, that is, a degree of automation of a driving control of the host vehicle M is the highest in the first driving mode, then decreases in an order of a second driving mode, a third driving mode, and a fourth driving mode, and is the lowest in the fifth driving mode. On the other hand, the task imposed on the driver is the slightest in the first driving mode, becomes severe in the order of the second driving mode, the third driving mode, and the fourth driving mode, and is the most severe in the fifth driving mode. In addition, since the control state is not the automatic driving in the driving mode other than the first driving mode, the control device 100 is responsible for ending the control of the automatic driving and to shift to the driving assist or manual driving. Hereinafter, the contents of the respective driving modes will be exemplified.

In the first driving mode, a state of the automatic driving is established, and neither forward monitoring nor gripping of the steering wheel 82 (steering gripping in the drawing) is imposed on the driver. However, even in the first driving mode, the driver is required to be in a posture in which the driver can quickly shift to the manual driving in response to a request from the control device 100. The term "automatic driving" as used herein means that both steering and acceleration/deceleration are controlled without depending on the operation of the driver. The front means a space in the traveling direction of the host vehicle M visually recognized through a front windshield. The first driving mode is, for example, a driving mode that can be executed when a condition that the host vehicle M travels at a predetermined speed or less (for example, about 60 [km/h]) on an automobile dedicated road such as an expressway and there is a preceding vehicle to be followed is satisfied.

In the second driving mode, a state of the driving assist is established, and a task of monitoring the front of the host vehicle M (hereinafter, referred to as front monitoring) is imposed on the driver, but a task of gripping the steering wheel 82 is not imposed on the driver. In the third driving mode, the state of the driving assist is established, and the task of the forward monitoring and the task of gripping the steering wheel 82 are imposed on the driver. The fourth driving mode is a driving mode in which a certain degree of driving operation by the driver is required with respect to at least one of steering and acceleration/deceleration of the host vehicle M. For example, in the fourth driving mode, the driving assistance such as an adaptive cruise control (ACC) and a lane keeping assist system (LKAS) is performed. In the fifth driving mode, both steering and acceleration/deceleration are in a state of the manual driving in which a driving operation by the driver is required. In both the fourth driving mode and the fifth driving mode, naturally, a task for monitoring the front of the host vehicle M is imposed on the driver.

Returning to FIG. 2, the second control unit 160 performs a control such that the host vehicle M passes through the target trajectory generated by the action plan generation unit 140 at a scheduled time. The second control unit 160 includes, for example, an acquisition unit 162, a speed control unit 164, and a steering control unit 166.

The acquisition unit 162 acquires information on the target trajectory (trajectory point) generated by the action plan generation unit 140, and stores the acquired information in a memory (not illustrated). The speed control unit 164 controls the travel driving force output device 200 (see FIG. 1) or the brake device 210 (see FIG. 1) based on a speed element associated with the target trajectory stored in the memory. The steering control unit 166 controls the steering device 220 (see FIG. 1) in accordance with a degree of curvature of the target trajectory stored in the memory. The processes of the speed control unit 164 and the steering control unit 166 are implemented by, for example, a combination of a feedforward control and a feedback control.

In the control device 100, a combination of the action plan generation unit 140 and the second control unit 160 constitutes a travel control unit 170. The travel control unit 170 executes a control of an automatic lane change in the host vehicle M based on a recognition result of a traveling situation, a traveling environment, or the like of the host vehicle M recognized by the recognition unit 130. In addition, the travel control unit 170 is an example of a lane change intention detection unit that detects the intention of the driver to change the lane based on the operation of the driving operation device 80 (for example, the turn signal lever 81) by the driver.

The travel control unit 170 selects one lane change mode from among a plurality of lane change modes having different degrees of involvement by the driver of the host vehicle M, and performs a travel control according to the selected lane change mode. The plurality of lane change modes in which the degree of involvement by the driver of the host vehicle M is different may be referred to as a plurality of lane change modes in which the degree of automation is different. The smaller the degree of involvement by the driver is, the higher the degree of automation is, and the larger the degree of involvement by the driver is, the lower the degree of automation is.

For example, the plurality of lane change modes may include the following three modes of automatic lane change. A first automatic lane change is an intended automatic lane change (ALC-category C) in which the driver of the host vehicle M intends to change the lane by himself or herself and the driver of the host vehicle M instructs start of the lane change. In the intended automatic lane change, the driver of the host vehicle M determines whether the lane change is to be performed in consideration of a traveling situation of another vehicle, a route to a destination, and the like. In a case where the lane change is to be performed, the driver of the host vehicle M gives an instruction to start the lane change to the host vehicle M by operating the driving operation device 80. Based on the instruction, the travel control unit 170 starts the automatic lane change at an executable timing in consideration of a surrounding traveling situation.

A second automatic lane change is a proposed automatic lane change (ALC-category D) in which the travel control unit 170 proposes a lane change and the driver of the host vehicle M approves the lane change. In the proposed automatic lane change, the travel control unit 170 determines whether the lane change is to be performed based on the traveling state of the other vehicle, the route to the destination, and the like. In the case where the lane change is to be performed, the travel control unit 170 proposes the lane change to the driver. In a case of approving the proposal of the lane change, the driver of the host vehicle M gives an instruction to start the lane change to the host vehicle M by operating an approval switch. The approval switch may be a switch dedicated to approval, or may be an operation device (for example, the driving operation device 80) that also serves as another function. Based on the instruction, the travel control unit 170 starts the automatic lane change at the executable timing in consideration of the surrounding traveling situation. Therefore, when the driver does not approve the proposal of the lane change, that is, when the driver does not operate the driving operation device 80, the automatic lane change is not executed.

A third automatic lane change is a determination automatic lane change (ALC-category E) in which the travel control unit 170 determines the lane change and the travel control unit 170 determines the start of the lane change. In the determination automatic lane change, the travel control unit 170 determines whether the lane change is to be performed based on the traveling state of the other vehicle, the route to the destination, and the like. In the case where the lane change is to be performed, the travel control unit 170 starts the automatic lane change at the executable timing in consideration of the surrounding traveling situation. In the case of the determination automatic lane change, the driver of the host vehicle M does not participate in the lane change.

The control device 100 executes the automatic lane change according to the driving mode. For example, the control device 100 can execute the determination automatic lane change in the first driving mode. The control device 100 can execute the proposed automatic lane change in the second driving mode, the third driving mode, and the fourth driving mode. The control device 100 can change the intended automatic lane change in the third driving mode and the fourth driving mode. In the fifth driving mode, the control device 100 does not execute any automatic lane change.

Returning to FIG. 1, the travel driving force output device 200 outputs a travel driving force (torque) for the vehicle to travel to driving wheels. The travel driving force output device 200 includes, for example, a combination of an internal combustion engine, an electric motor, a transmission, and the like, and an electronic control unit (ECU) that controls these components. The ECU controls the above-described configuration in accordance with information input from the second control unit 160 or information input from the driving operation device 80.

The brake device 210 includes, for example, a brake caliper, a cylinder that transmits a hydraulic pressure to the brake caliper, an electric motor that causes the cylinder to generate a hydraulic pressure, and a brake ECU, The brake ECU controls the electric motor according to information input from the second control unit 160 or information input from the driving operation device 80 such that a brake torque according to a braking operation is output to each vehicle wheel.

The steering device 220 includes, for example, a steering ECU and an electric motor. The electric motor changes a direction of a steered wheel by applying a force to a rack and pinion mechanism, for example. The steering ECU drives the electric motor according to information input from the second control unit 160 or information input from the driving operation device 80 to change the direction of the steered wheel.

Steering Wheel 82 and Turn Signal Lever 81

Figure 4:
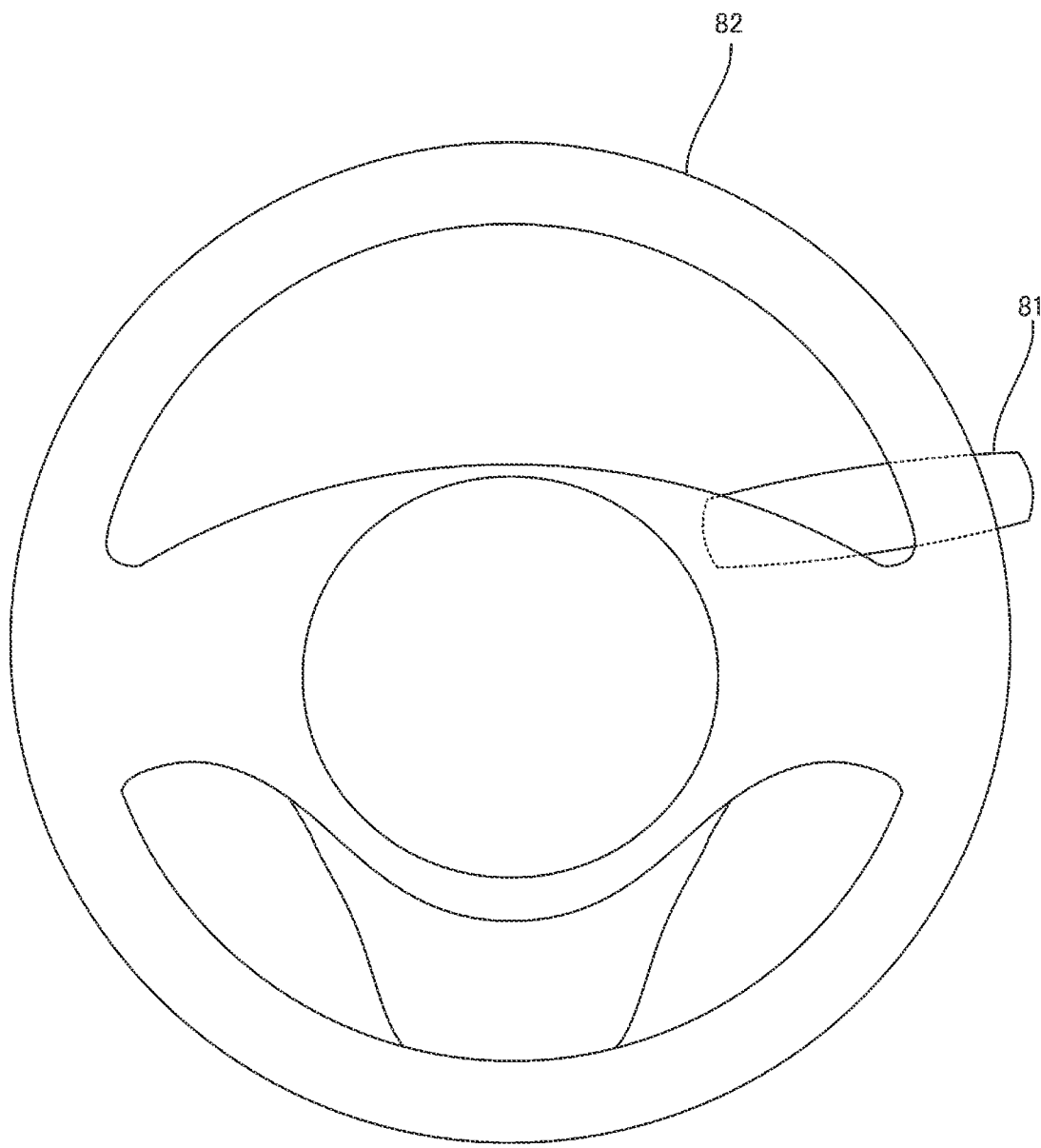
FIG. 4 is a diagram illustrating an example of a steering wheel 82 and a turn signal lever 81.

FIG. 4 is a diagram illustrating an example of the steering wheel 82 and the turn signal lever 81. For example, as illustrated in FIG. 4, the turn signal lever 81 is an operation device provided at a position and in a shape where a blind operation can be performed with one hand (for example, one finger of a right hand) gripped by the driver when the driver grips the steering wheel 82.

Operation of Turn Signal Lever 81

Figure 5:
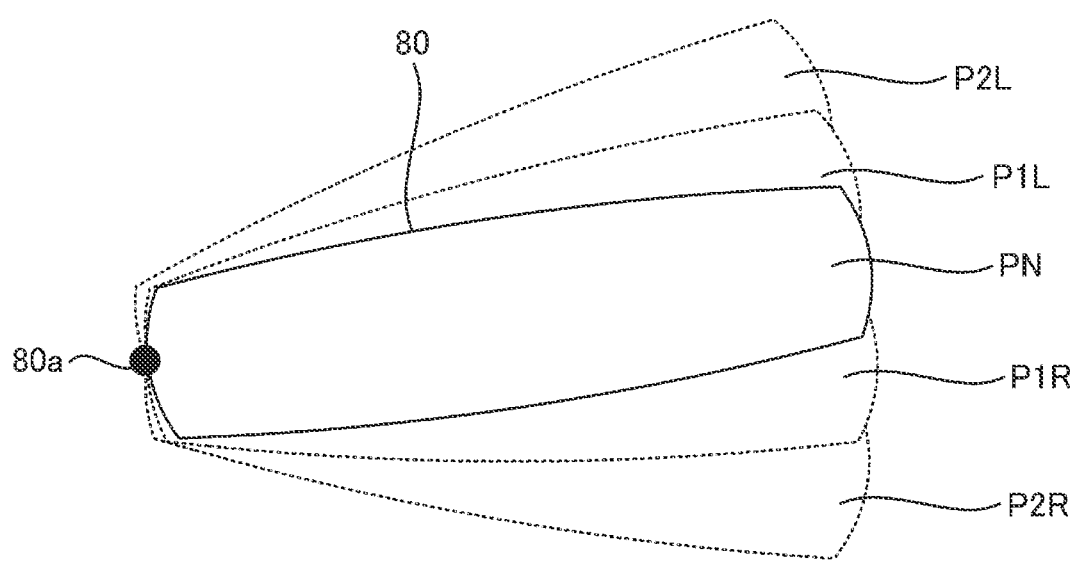
FIG. 5 is a diagram illustrating a specific example of an operation of the turn signal lever 81.

FIG. 5 is a diagram illustrating a specific example of the operation of the turn signal lever 81. As illustrated in FIG. 5, the turn signal lever 81 is rotatable around a support shaft 80a. A neutral position PN, half pressed positions P1L, P1R, and fully pressed positions P2L, P2R are positions at which the turn signal lever 81 is displaceable by the rotation.

The neutral position PN is a position in a state in which the turn signal lever 81 is not operated, and when the turn signal lever 81 is in the neutral position PN, the turn signal 83 is turned off.

The half pressed position P1L is a hollow position where the turn signal lever 81 is rotated counterclockwise by a predetermined amount from the neutral position PN. The fully pressed position P2L is an end position where the turn signal lever 81 is further rotated counterclockwise by a predetermined amount from the half pressed position P1L. The half pressed position P1R is a hollow position where the turn signal lever 81 is rotated clockwise by a predetermined amount from the neutral position PN. The fully pressed position P2R is an end position where the turn signal lever 81 is further rotated clockwise by a predetermined amount from the half pressed position P1R. The half pressed positions P1L, P1R are examples of a first position of the turn signal lever 81. The fully pressed positions P2L, P2R are examples of a second position of the turn signal lever 81.

When the turn signal lever 81 is tilted to the half pressed positions P1L, P1R by the driver, the turn signal lever 81 gives a click feeling to the driver, and when an operation force to the turn signal lever 81 is released from this state, the turn signal lever 81 is mechanically returned to the neutral position PN by a return mechanism (not illustrated) such as a spring. In addition, when the turn signal lever 81 is tilted to the fully pressed positions P2L, P2R by the driver, the turn signal lever 81 is held at the fully pressed positions P2L, P2R by a mechanical lock mechanism (not illustrated) even when the operation force is released.

The turn signal lever 81 is provided with a switch (not illustrated), and the travel control unit 170 can determine which of the neutral position PN, the half pressed positions P1L, P1R, and the fully pressed positions P2L, P2R the turn signal lever 81 is located based on a detection result by the switch.

In a state in which the turn signal lever 81 is held at the fully pressed positions P2L, P2R, when the steering wheel 82 is rotated in a reverse direction and returned to a neutral position, or when the driver performs an operation of returning the turn signal lever 81 toward the neutral position, the turn signal lever 81 is unlocked by the lock mechanism and returned to the neutral position PN. That is, when the turn signal lever 81 is operated to the fully pressed positions P2L, P2R, the turn signal lever 81 operates in the same manner as a turn signal blinking device that is generally performed in the related art.

Hereinafter, an operation of keeping the turn signal lever 81 at the half pressed position P1L or the half pressed position P1R is referred to as a "half-lock operation". The half-lock operation is an example of a predetermined operation of the present invention.

Process for Automatic Lane Change by Travel Control Unit 170

Figure 6:
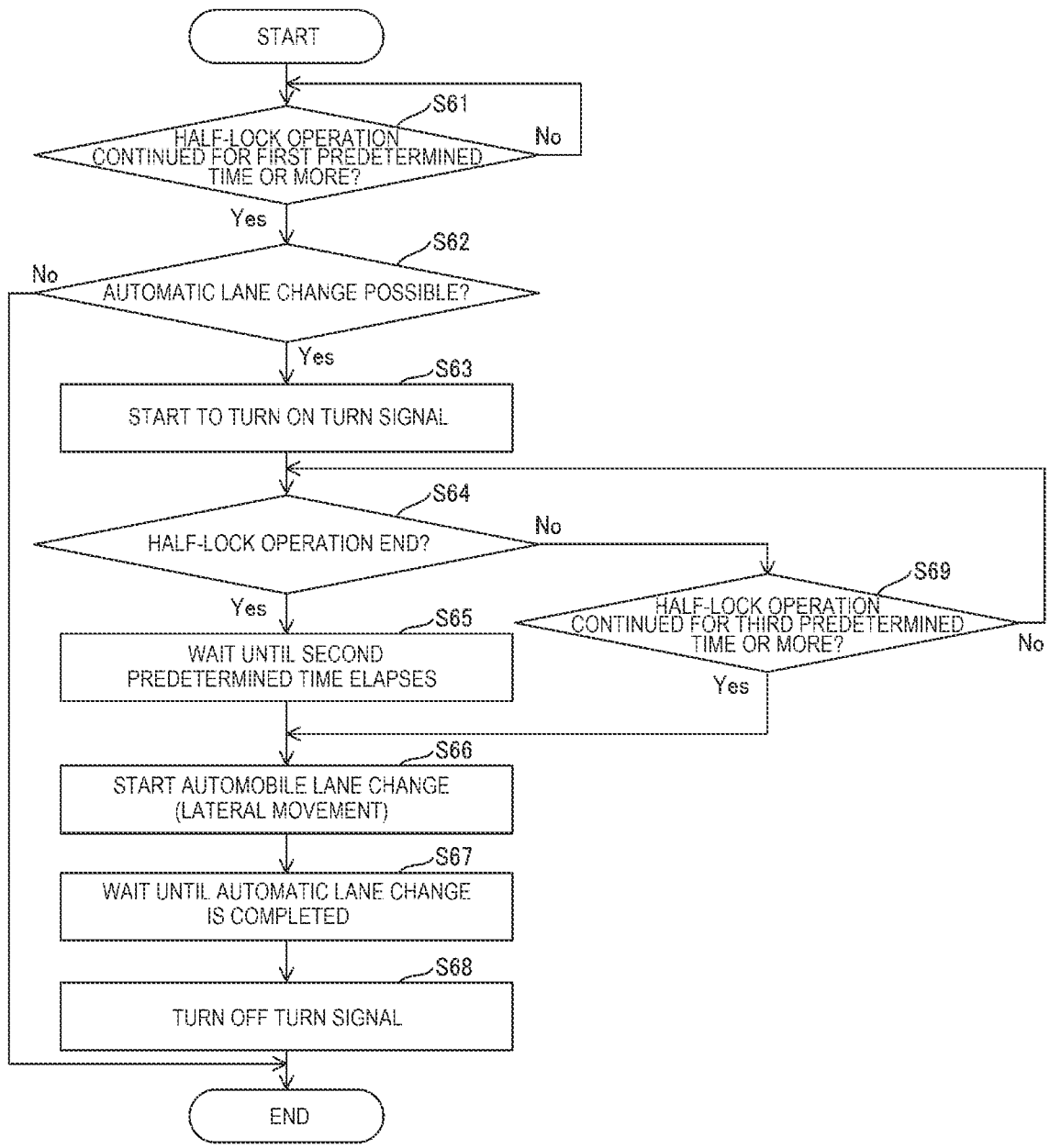
FIG. 6 is a flowchart illustrating a first example of a process for an automatic lane change by a travel control unit 170.

FIG. 6 is a flowchart illustrating a first example of a process for the automatic lane change by the travel control unit 170. The travel control unit 170 repeatedly executes, for example, the process illustrated in FIG. 6 while the host vehicle M is traveling as the process for the automatic lane change.

First, the travel control unit 170 determines whether the half-lock operation of the turn signal lever 81 is continued for a first predetermined time or more (step S61), and waits until the half-lock operation continues for the first predetermined time or more (step S61: a loop of No). The first predetermined time is a time required to confirm the intention of the driver to change the lane, and is 1.0 [sec] as an example.

In step S61, when the half-lock operation continues for the first predetermined time or more (step S61: Yes), the travel control unit 170 detects the intention of the driver to change the lane. In this case, the travel control unit 170 determines whether the automatic lane change of the host vehicle M to an adjacent lane is possible based on the recognition result by the recognition unit 130 (step S62).

In step S62, when the automatic lane change is not possible (step S62: No), the travel control unit 170 ends a series of processes. At this time, the travel control unit 170 may perform a control or the like of notifying the driver that the automatic lane change is not possible.

In step S62, when the automatic lane change is possible (step S62: Yes), the travel control unit 170 performs a control to start to turn on the turn signal 83 (step S63). Specifically, when the half-lock operation of keeping the turn signal lever 81 at the half pressed position P1L continues for the first predetermined time or more, the travel control unit 170 performs the control to start to turn on the turn signal 83 provided on the left side of the host vehicle M. In addition, when the half-lock operation of keeping the turn signal lever 81 at the half pressed position P1R continues for the first predetermined time or more, the travel control unit 170 performs a control to start to turn on the turn signal 83 provided on the right side of the host vehicle M.

Next, the travel control unit 170 determines whether the half-lock operation ends (step S64). When the half-lock operation ends (step S64: Yes), the travel control unit 170 waits until a second predetermined time elapses (step S65) after the turn signal 83 is started to be turned on in step S63 (after the intention of the driver to change the lane is detected). The second predetermined time is a time defined by regulations as a waiting time required from the start of the turning-on of the turn signal 83 to start of a lateral movement for the automatic lane change, and is 3.0 [sec] as an example. In addition, when the process proceeds to step S65, if the second predetermined time has elapsed after the turn signal 83 is started to be turned on in step S63, the travel control unit 170 ends step S65 without waiting.

Next, the travel control unit 170 performs a control to start the lateral movement for the automatic lane change of the host vehicle NI to the adjacent lane (step S66). Specifically, when the half-lock operation of keeping the turn signal lever 81 at the half pressed position P1L continues for the first predetermined time or more, the travel control unit 170 starts the movement of the host vehicle NI to the left side so as to move the host vehicle M to a lane on the left side of a current traveling lane. When the half-lock operation of keeping the turn signal lever 81 at the half pressed position P1R continues for the first predetermined time or more, the travel control unit 170 starts the movement of the host vehicle M to the right side so as to move the host vehicle NI to a lane on the right side of the current traveling lane.

Next, the travel control unit 170 waits until the automatic lane change to the adjacent lane started in step S66 is completed (step S67). Next, the travel control unit 170 performs a control to turn off the turn signal 83 that has been turned on in step S63 (step S68), and ends the series of processes.

In step S64, when the half-lock operation does not end (step S64: No), the travel control unit 170 determines whether the half-lock operation is continued for a third predetermined time or more after the turn signal 83 is started to be turned on in step S63 (after the intention of the driver to change the lane is detected) (step S69). The third predetermined time is a time longer than the second predetermined time, and is 5.0 [sec] as an example.

In step S69, when the half-lock operation has not continued for the third predetermined time or more (step S69: No), the travel control unit 170 returns to step S64. When the half-lock operation continues for the third predetermined time or more (step S69: Yes), the travel control unit 170 proceeds to step S66 and starts the lateral movement for the automatic lane change of the host vehicle M.

Automatic Lane Change Under Control of Travel Control Unit 170

Figure 7:
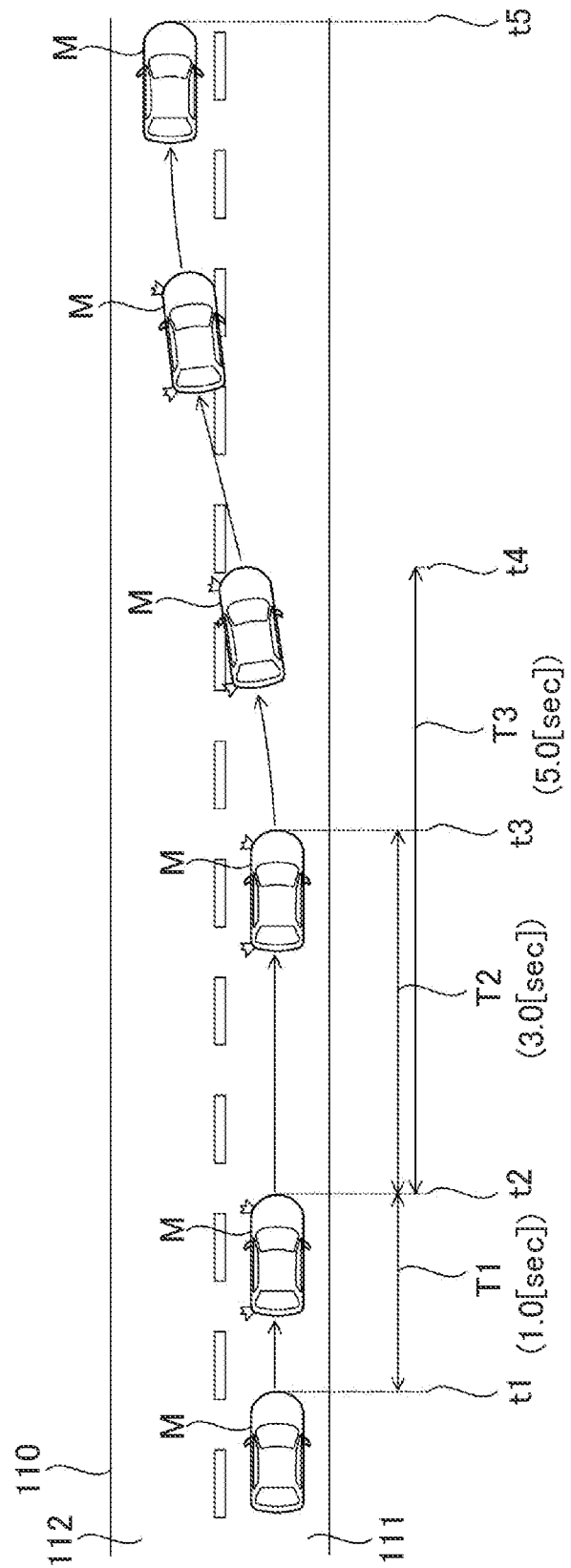
FIG. 7 is a diagram illustrating a first example of the automatic lane change under a control of the travel control unit 170.

FIG. 7 is a diagram illustrating a first example of an automatic lane change under the control of the travel control unit 170. In the example of FIG. 7, it is assumed that the host vehicle M is traveling on a right lane 111 of a two-lane road 110 having the right lane 111 and a left lane 112. Here, the transition of time will be described in association with a change in a leading position of the host vehicle M traveling in a right direction in the drawing.

At a time point t1, it is assumed that the driver intends to change the lane from the right lane 111 to the left lane 112 and starts the half-lock operation of keeping the turn signal lever 81 at the half pressed position P1L. A time point t2 is a time point at which a first predetermined time T1 (for example, 1.0 [sec]) has elapsed from the time point t1. A time point t3 is a time point at which a second predetermined time T2 (for example, 3.0 [sec]) has elapsed from the time point t2. A time point t4 is a time point at which a third predetermined time T3 (for example, 5.0 [sec]) has elapsed from the time point t2.

At the time point t2 at which the first predetermined time T1 has elapsed from the time point t1, the travel control unit 170 detects the intention of the driver to change the lane and starts to turn on the turn signal 83 on the left side of the host vehicle M. In addition, the travel control unit 170 does not start the lateral movement for the automatic lane change until the time point t3 at which the second predetermined time T2 has elapsed from the time point t2.

In the example of FIG. 7, it is assumed that the driver ends the half-lock operation between the time point t2 and the time point t3. In this case, the travel control unit 170 starts the lateral movement for the automatic lane change at the time point t3. This operation is realized by the travel control unit 170 determining that the half-lock operation ends between the time point t2 and the time point t3 in the process of FIG. 6 (step S64: Yes), waiting until the time point t3 in step S65, and then proceeding to step S66.

Then, at a time point t5, it is assumed that the lane change of the host vehicle M from the right lane 111 to the left lane 112 is completed, in this case, the travel control unit 170 turns off the turn signal 83 on the left side of the host vehicle M at the time point t5.

Figure 8:
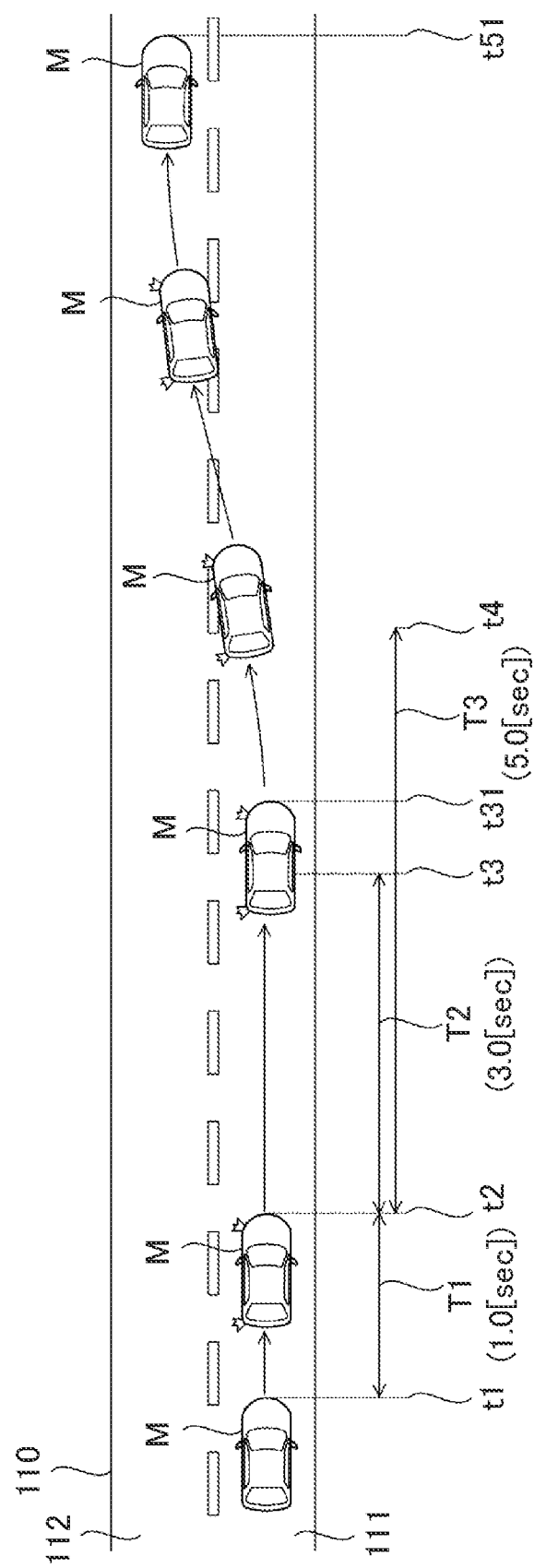
FIG. 8 is a diagram illustrating a second example of the automatic lane change under the control of the travel control unit 170.

FIG. 8 is a diagram illustrating a second example of the automatic lane change under the control of the travel control unit 170. In the example of FIG. 8, it is assumed that the driver ends the half-lock operation at a time point t31 between the time point t3 and the time point t4. In this case, the travel control unit 170 starts the lateral movement for the automatic lane change at the time point t31. This operation is realized by the travel control unit 170 determining that the half-lock operation ends between the time point t3 and the time point t4 in the process of FIG. 6 (step S64: Yes), and proceeding to step S66 without waiting because the time point t3 has already passed (the second predetermined time has elapsed) in step S65.

In the example of FIG. 8, it is assumed that the lane change of the host vehicle M from the right lane 111 to the left lane 112 is completed at a time point t51. In this case, the travel control unit 170 turns off the turn signal 83 on the left side of the host vehicle M at the time point t51.

Figure 9:
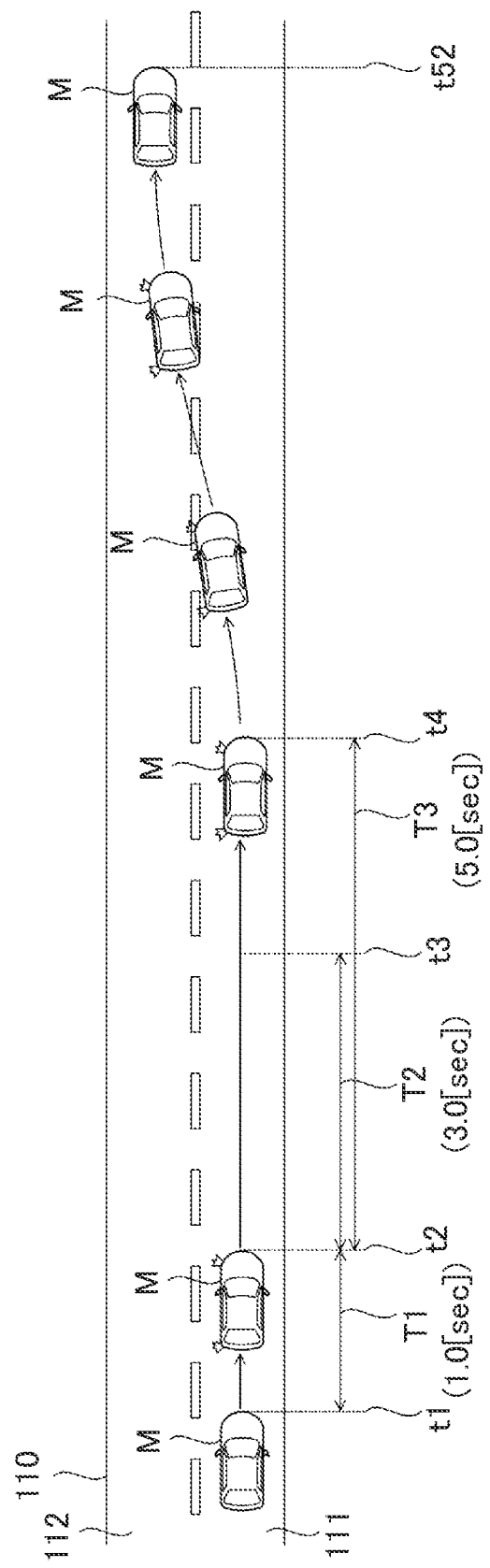
FIG. 9 is a diagram illustrating a third example of the automatic lane change under the control of the travel control unit 170.

FIG. 9 is a diagram illustrating a third example of the automatic lane change under the control of the travel control unit 170. In the example of FIG. 9, it is assumed that the driver maintains the half-lock operation until the time point t4. In this case, the travel control unit 170 starts the lateral movement for the automatic lane change at the time point t4. This operation is realized by the travel control unit 170 determining that the half-lock operation is continued for the third predetermined time or more in the process of FIG. 6 (step S69: Yes) and proceeding to step S66.

In the example of FIG. 9, it is assumed that the lane change of the host vehicle M from the right lane 111 to the left lane 112 is completed at a time point t52. In this case, the travel control unit 170 turns off the turn signal 83 on the left side of the host vehicle M at the time point t52.

In this manner, the travel control unit 170 detects the intention of the driver to change the lane based on the half-lock operation (predetermined operation) of the turn signal lever 81 (operation device) by the driver. In addition, the travel control unit 170 determines whether the lane change of the host vehicle M is possible based on the surrounding situation recognized by the recognition unit 130. Then, the travel control unit 170 controls the lane change of the host vehicle M based on the detection result of the intention of the driver to change the lane and the determination result of whether the lane change is possible.

When the lane change of the host vehicle M is possible after the intention of the driver to change the lane is detected, the travel control unit 170 determines a start timing of the lateral movement in the lane change of the host vehicle M based on the content (for example, a operation time) of the half-lock operation of the turn signal lever 81 by the driver.

Specifically, when the half-lock operation of the turn signal lever 81 is operated (performed) for the first predetermined time (for example, 1.0 [sec]) or more, the travel control unit 170 detects that there is an intention to change the lane. In addition, the travel control unit 170 performs the control to start to turn on the turn signal 83 (notification of the turn signal) when the intention of the driver to change the lane is detected, and to start the lateral movement for the automatic lane change after the second predetermined time (for example, 3.0 [sec]) elapses from the start of turning-on of the turn signal 83.

Accordingly, since the lateral movement for the automatic lane change is not started for the second predetermined time from the start of the turning-on of the turn signal 83, it is possible to start the lane change at any timing of the driver with an operation content of the turn signal lever 81 operated to detect the intention to change the lane, while sufficiently transmitting the intention to change the lane to the surroundings of the host vehicle M (or following the regulations). Therefore, it is possible to facilitate the operation for starting the lane change at any timing of the driver.

After the intention of the driver to change the lane is detected, the travel control unit 170 starts the lateral movement for the automatic lane change after the second predetermined time elapses when the half-lock operation of the turn signal lever 81 ends (for example, refer to FIG. 7), and performs the control to wait for the lane change of the host vehicle M when the half-lock operation of the turn signal lever 81 is continued (for example, refer to FIGS. 8 and 9). Thus, by ending the half-lock operation of the turn signal lever 81 started to detect the intention to change the lane, it is possible to start the lane change at any timing of the driver. Therefore, it is possible to facilitate the operation for starting the lane change at any timing of the driver.

However, even when the half-lock operation of the turn signal lever 81 is continued after the intention of the driver to change the lane is detected, when the half-lock operation of the turn signal lever 81 is continued for the third predetermined time (for example, 5.0 [sec]) or more after the intention of the driver to change the lane is detected, the travel control unit 170 performs the control to start the lateral movement for the automatic lane change before the end of the half-lock operation of the turn signal lever 81 (for example, see FIG. 9). As a result, it is possible to prevent the vehicle from staying in the current traveling lane for a long time in a state in which the turn signal 83 is turned on, and to prevent an influence on other vehicles.

Another Example of Process for Automatic Lane Change by Travel Control Unit 170

Figure 10:
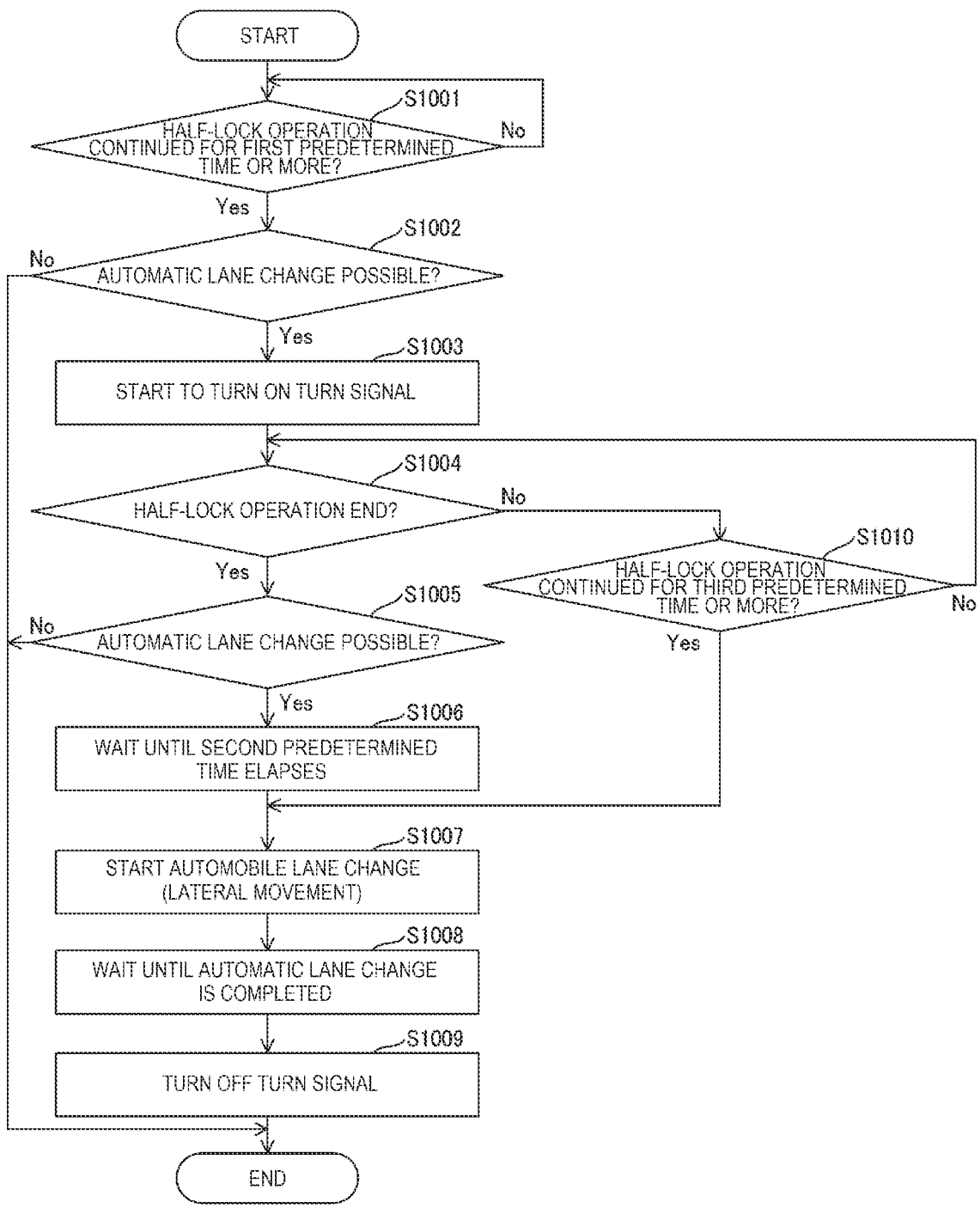
FIG. 10 is a flowchart illustrating a second example of the process for the automatic lane change by the travel control unit 170.

FIG. 10 is a flowchart illustrating a second example of the process for the automatic lane change by the travel control unit 170. The travel control unit 170 may repeatedly execute, for example, the process illustrated in FIG. 10 during traveling of the host vehicle M as the process for the automatic lane change.

Steps S1001 to S1004 illustrated in FIG. 10 are the same as steps S61 to S64 illustrated in FIG. 6. In step S1004, when the half-lock operation of the turn signal lever 81 ends (step S1004: Yes), the travel control unit 170 determines again whether the automatic lane change is possible based on the recognition result by the recognition unit 130 (step S1005).

In step S1005, when the automatic lane change is not possible (step S1005: No), the travel control unit 170 ends a series of processes. At this time, the travel control unit 170 may perform a control or the like of notifying the driver that the automatic lane change is not possible. When the automatic lane change is possible (step S1005: Yes), the travel control unit 170 proceeds to step S1006. Steps S1006 to S1010 illustrated in FIG. 10 are the same as steps S65 to S69 illustrated in FIG. 6.

As described with reference to FIG. 10, when the half-lock operation of the turn signal lever 81 ends, the travel control unit 170 may abort performing a control to start the lateral movement for the automatic lane change based on the surrounding situation recognized by the recognition unit 130 at that time point. As a result, even if the half-lock operation of the turn signal lever 81 ends, when the automatic lane change is not possible, the host vehicle M can continue traveling in the current traveling lane.

Figure 11:
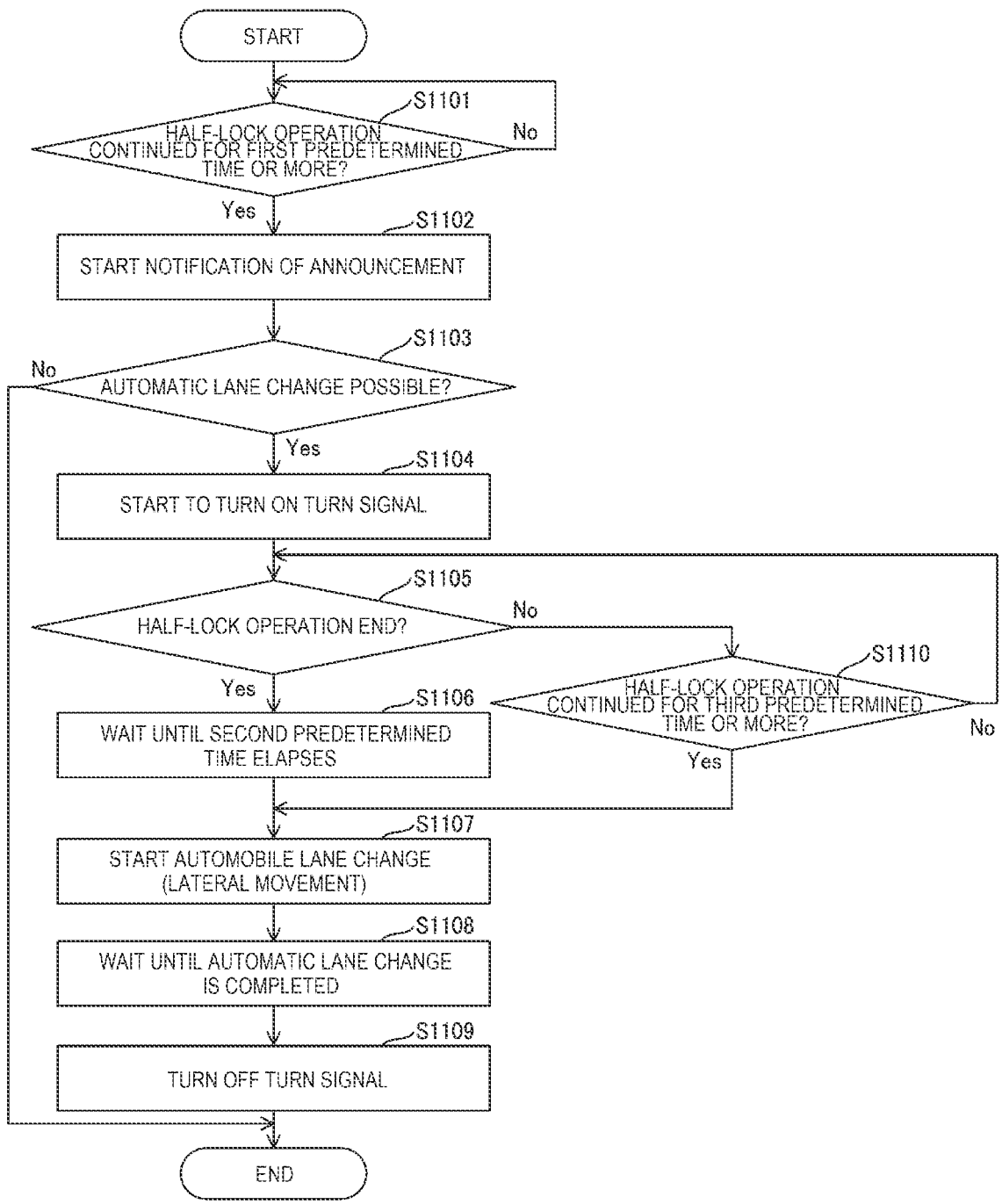
FIG. 11 is a flowchart illustrating a third example of the process for the automatic lane change by the travel control unit 170.

FIG. 11 is a flowchart illustrating a third example of the process for the automatic lane change by the travel control unit 170. The travel control unit 170 may repeatedly execute, for example, the process illustrated in FIG. 11 during traveling of the host vehicle M as the process for the automatic lane change.

Step S1101 illustrated in FIG. 11 is the same as step S61 illustrated in FIG. 6. In step S1101, when the half-lock operation continues for the first predetermined time or more (step S1101: Yes), the travel control unit 170 detects the intention of the driver to change the lane, and starts notification of an announcement to the driver of the host vehicle M according to an operation situation related to the automatic lane change (step S1102). Next, the travel control unit 170 proceeds to step S1103. Steps S1103 to S1110 illustrated in FIG. 11 are the same as steps S62 to S69 illustrated in FIG. 6.

The notification of the announcement started in step S1102 is performed by voice output or screen display via the HMI 30, for example. For example, when the turn signal 83 starts to be turned on in step S1104, the travel control unit 170 notifies an announcement that the second predetermined time has elapsed, such as "waiting for lane change". In addition, when the second predetermined time has elapsed, the travel control unit 170 notifies an announcement that the lateral movement for the automatic lane change is started when the half-lock operation of the turn signal lever 81 ends after the second predetermined time, such as "lane change is performed when the lever is released".

As described with reference to FIG. 11, when the intention of the driver to change the lane is detected, the travel control unit 170 may notify the driver of an announcement in accordance with the operation situation related to the automatic lane change. As a result, it is possible to notify the driver of the current operation situation related to the automatic lane change in an easy-to-understand manner.

In the process illustrated in FIG. 11, as in the process illustrated in FIG. 10, when the half-lock operation of the turn signal lever 81 ends, the control may be performed so as not to start the lateral movement for the automatic lane change based on the surrounding situation recognized by the recognition unit 130 at that time point.

Figure 12:
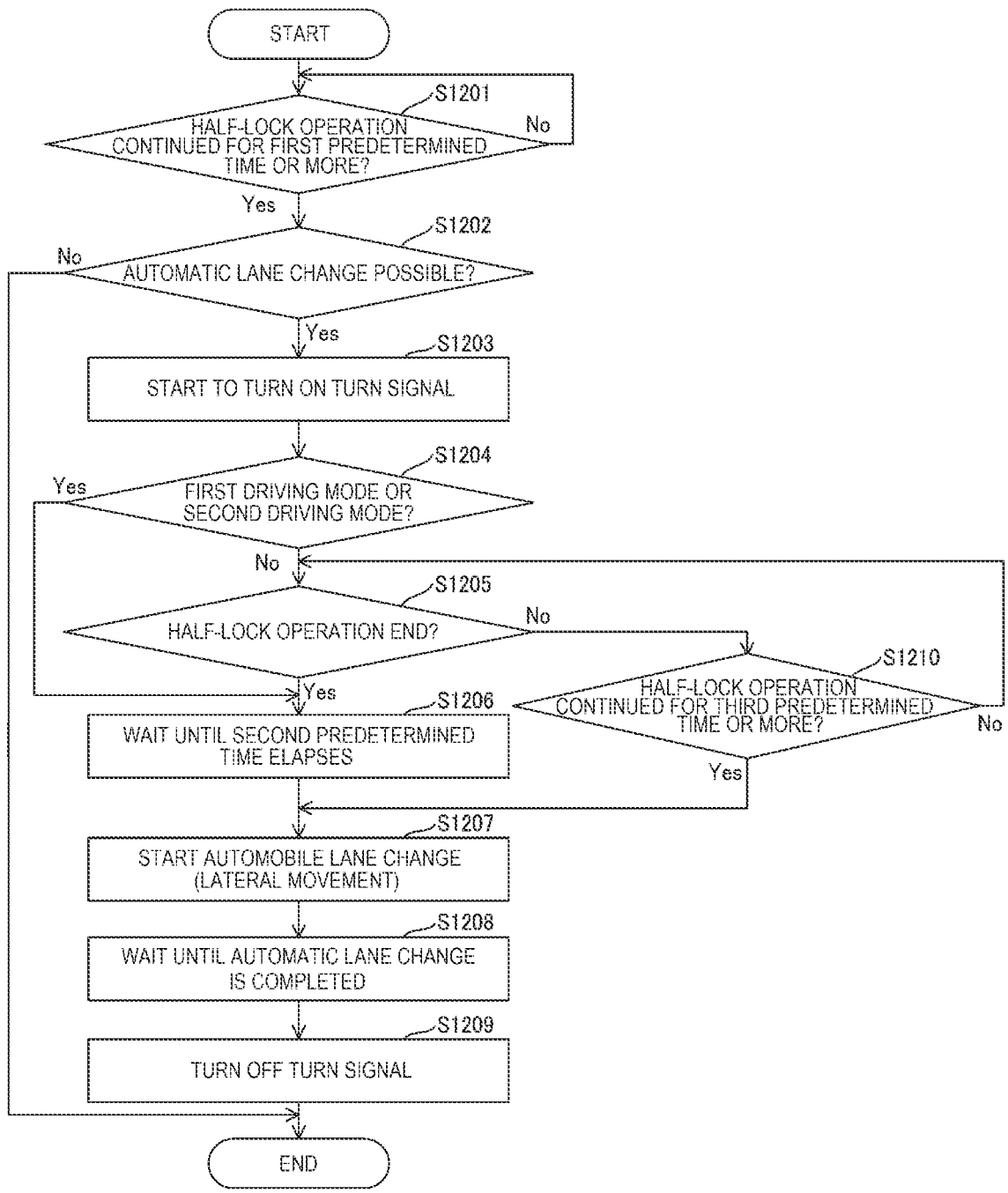
FIG. 12 is a flowchart illustrating a fourth example of the process for the automatic lane change by the travel control unit 170.

FIG. 12 is a flowchart illustrating a fourth example of the process for the automatic lane change by the travel control unit 170. The travel control unit 170 may repeatedly execute, for example, the process illustrated in FIG. 12 during traveling of the host vehicle M as the process for the automatic lane change.

Steps S1201 to S1203 illustrated in FIG. 12 are the same as steps S61 to S63 illustrated in FIG. 6. After step S1203, the travel control unit 170 determines whether the current driving mode of the host vehicle M is the first driving mode or the second driving mode described above (step S1204). The determination in step S1204 is performed based on the determination result by the mode determination unit 150.

In step S1204, when the current driving mode of the host vehicle M is neither the first driving mode nor the second driving mode (step S1204: No), that is, when the current driving mode of the host vehicle M is a driving mode (first mode) in which the driver needs to operate or grip the steering wheel 82, the travel control unit 170 proceeds to step S1205 and accepts the operation of maintaining the half-lock operation of the turn signal lever 81. Steps S1205 to S1210 illustrated in FIG. 12 are the same as steps S64 to S69 illustrated in FIG. 6.

In step S1204, when the current driving mode of the host vehicle M is the first driving mode or the second driving mode (step S1204: Yes), that is, when the current driving mode of the host vehicle M is a driving mode (second mode) in which the driver does not need to operate or grip the steering wheel 82, the travel control unit 170 proceeds to step S1206, and starts the lateral movement for the automatic lane change after the second predetermined time elapses. In this case, the travel control unit 170 does not accept the operation of maintaining the half-lock operation of the turn signal lever 81 until the second predetermined time elapses in order to wait for the automatic lane change.

As described in FIG. 12, when the current driving mode of the host vehicle M is a driving mode (second mode) in which the driver does not need to operate or grip the steering wheel 82, the travel control unit 170 may perform a control so as not to accept the half-lock operation (operation of keeping the turn signal lever 81 at the hollow position) of the turn signal lever 81.

Accordingly, when the driver is operating or gripping the steering wheel 82, the start timing of the lateral movement in the automatic lane change of the host vehicle M can be determined by the timing at which the half-lock operation of the turn signal lever 81 ends. In the automatic lane change performed in this case, since the driver operates or grips the steering wheel 82, even if the surrounding situation of the host vehicle M suddenly changes, it is possible to cope with the sudden change by the operation of the steering wheel 82 by the driver.

In the process illustrated in FIG. 12, as in the process illustrated in FIG. 10, when the half-lock operation of the turn signal lever 81 ends, the control may be performed so as not to start the lateral movement for the automatic lane change based on the surrounding situation recognized by the recognition unit 130 at that time point. In addition, in the process illustrated in FIG. 12, when the intention of the driver to change the lane is detected as in the process illustrated in FIG. 11, the driver can be notified of the announcement in accordance with the operation situation related to the automatic lane change.

Although the embodiment of the present invention has been described above, the present invention is not limited to the above-described embodiments, and modifications, improvements, and the like can be made as appropriate.

For example, although the half-lock operation of the turn signal lever 81 has been described as an example of the predetermined operation of the operation device, the predetermined operation of the operation device is not limited to the half-lock operation of the turn signal lever 81, and may be various operations with respect to various operation devices. For example, the steering wheel 82 may be provided with a button for the automatic lane change, and the predetermined operation of the operation device may be pressing of the button.

Although specific examples the first predetermined time, the second predetermined time, and the third predetermined time have been described using 1.0 [sec], 3.0 [sec], and 5.0 [sec], respectively, the first predetermined time, the second predetermined time, and the third predetermined time are not limited to these examples. For example, the second predetermined time can be appropriately set to, for example, 0.4 [sec] or the like according to regulations or the like of a region in which the host vehicle M travels. In addition, the travel control unit 170 may specify a region in which the host vehicle M travels based on the position of the host vehicle M specified by the GNSS receiver 61, and may set the first predetermined time, the second predetermined time, and the third predetermined time based on the specified region.

In the present specification, at least the following matters are described. It should be noted that the corresponding constituent elements and the like in the above-described embodiment are illustrated in parentheses, but the present invention is not limited thereto.

(1) A control device (control device 100) for performing a travel control of a vehicle (host vehicle M), the control device including:
    a lane change intention detection unit (travel control unit 170) configured to detect an intention of a driver to change a lane based on a predetermined operation on an operation device (turn signal lever 81) by the driver; and a travel control unit (travel control unit 170) configured to determine whether a lane change of the vehicle is possible based on a surrounding situation recognized by a recognition unit (recognition unit 130) configured to recognize the surrounding situation of the vehicle, and to control the lane change of the vehicle based on a detection result of the lane change intention detection unit and a determination result of whether the lane change of the vehicle is possible, in which the travel control unit is configured to determine a start timing of a lateral movement in the lane change of the vehicle based on an operation on the operation device by the driver when the lane change of the vehicle is possible after the intention of the driver to change the lane is detected.

According to (1), the driver can start the lane change at any timing of the driver by the operation on the operation device operated to detect the intention to change the lane. Therefore, it is possible to facilitate an operation for starting the lane change at any timing of the driver.

(2) The control device according to (1), in which the lane change intention detection unit is configured to detect the intention to change the lane when the predetermined operation on the operation device is performed for a first predetermined time (first predetermined time T1) or more, and in which the travel control unit is configured to perform a control to start notification by a turn signal (turn signal 83) when the intention of the driver to change the lane is detected, and to start the lateral movement after a second predetermined time (second predetermined time T2) elapses from start of the notification by the turn signal.

According to (2), since the notification by the turn signal is started by operating (performing) the predetermined operation for the first predetermined time, and the lateral movement for the lane change is not started for the second predetermined time from the start of the notification by the turn signal, it is possible to start the lane change at any timing of the driver with the operation on the operation device operated to detect the intention to change the lanes, while sufficiently transmitting the intention to change the lane to the surroundings of the host vehicle (or following the regulations). Therefore, it is possible to facilitate an operation for starting the lane change at any timing of the driver.

(3) The control device according to (2), in which the travel control unit is configured, after the intention of the driver to change the lane is detected, to perform the control to start the lateral movement after the second predetermined time elapses in a case of the predetermined operation being over, and to defer the lane change of the vehicle in a case of the predetermined operation being continued.

According to (3), by ending the predetermined operation started to detect the intention to change the lane, it is possible to start the lane change at any timing of the driver.

(4) The control device according to (3), in which the travel control unit is configured to perform the control to start the lateral movement before the predetermined operation ends in a case where the predetermined operation is continued for a third predetermined time (third predetermined time T3) or more from a detection of the intention of the driver to change the lane, and the third predetermined time is longer than the second predetermined time.

According to (4), it is possible to prevent the vehicle from staying in the current traveling lane for a long time in a state in which the turn signal is notified, and to prevent an influence on other vehicles.

(5) The control device according to (3) or (4), in which the travel control unit is configured to abort performing a control to start the lateral movement based on the surrounding situation recognized by the recognition unit no matter the predetermined operation being over.

According to (5), even if the predetermined operation ends, when the lane change is not possible, the vehicle can continue traveling in the current traveling lane.

(6) The control device according to any one of (1) to (5), in which the travel control unit is configured to notify the driver of an announcement in accordance with an operation situation related to the lane change, when the intention of the driver to change the lane is detected.

According to (6), it is possible to notify the driver of the operation situation related to the current lane change in an easy-to-understand manner.

(7) The control device according to any one of (1) to (6), in which the operation device is a turn signal lever (turn signal lever 81), in which a position at which the turn signal lever is movable includes a neutral position (neutral position PN), a first position (half pressed positions P1L, P1R) arranged in each of two directions different from each other with respect to the neutral position, in which the turn signal lever positioned at the first position returns to the neutral position when no operation force is applied to the turn signal lever by the driver, and a second position (fully pressed positions P2L, P2R) arranged in each of two directions with respect to the neutral position, in which a movement amount of the turn signal lever from the neutral position to the second position is larger than that from the neutral position to the first position, and in which the turn signal lever positioned at the second position stays thereat when no operation force is applied to the turn signal lever by the driver, and in which the predetermined operation is an operation of keeping the turn signal lever at the first position.

According to (7), the driver can start the lane change at any timing of the driver by the operation of the turn signal lever kept at the first position in order to detect the intention to change the lane. Therefore, it is possible to facilitate an operation for starting the lane change at any timing of the driver.

(8) The control device according to (7), further including:

a control state setting unit configured to select and set an automation mode of a control of at least one of a traveling speed and steering of the vehicle from a plurality of driving modes, in which the plurality of driving modes include a first mode and a second mode in which a task imposed on the driver is slighter than in the first mode, and in which the travel control unit is configured not to accept an operation of keeping the turn signal lever at the first position when the second mode is set.

According to (8), when the task imposed on the driver is a relatively severe driving mode, the timing of the lateral movement in the lane change of the host vehicle can be determined by the timing at which the operation of keeping the turn signal lever at the first position ends. In the lane change performed in this case, since a relatively severe task is imposed on the driver, it is possible to cope with a sudden change in the surrounding situation of the host vehicle by the operation of the driver.

(9) The control device according to (8),
in which the first mode is an automation mode in which the driver needs to operate or grip a steering wheel of the vehicle, and
in which the second mode is an automation mode in which the driver does not need to operate or grip the steering wheel.

According to (9), when the driver operates or grips the steering wheel, the timing of the lateral movement in the lane change of the host vehicle can be determined by the timing at which the operation of keeping the turn signal lever at the first position ends. In the lane change performed in this case, since the driver operates or grips the steering wheel, even if the surrounding situation of the host vehicle suddenly changes, it is possible to cope with the sudden change by the operation of the steering wheel by the driver.

What is claimed is:

1. A control device for performing a travel control of a vehicle, the control device comprising:
   a lane change intention detection unit configured to detect an intention of a driver to change a lane when a predetermined operation on an operation device by the driver is performed for a first predetermined time or more; and
   a travel control unit configured to determine whether a lane change of the vehicle is possible based on a surrounding situation recognized by a recognition unit configured to recognize the surrounding situation of the vehicle, and to control the lane change of the vehicle based on a detection result of the lane change intention detection unit and a determination result of whether the lane change of the vehicle is possible,
   wherein the travel control unit is configured to determine a start timing of a lateral movement in the lane change of the vehicle based on an end of the predetermined operation on the operation device by the driver received when the lane change of the vehicle is possible after the intention of the driver to change the lane is detected,
   wherein the travel control unit is configured to perform a control to start notification by a turn signal when the intention of the driver to change the lane is detected, and to start the lateral movement after a second predetermined time elapses from start of the notification by the turn signal,
   wherein the travel control unit is configured, after the intention of the driver to change the lane is detected, to perform the control to start the lateral movement after the second predetermined time elapses in a case of the predetermined operation being over, and to defer the lane change of the vehicle in a case of the predetermined operation being continued,
   wherein the travel control unit is configured to perform the control to start the lateral movement before the predetermined operation ends in a case where the predetermined operation is continued for a third predetermined time or more from a detection of the intention of the driver to change the lane,
   wherein the third predetermined time is longer than the second predetermined time, and
   wherein the lane change intention detection unit and the travel control unit are each implemented via at least one processor.

2. The control device according to claim 1,
wherein the travel control unit is further configured to abort performing a control to start the lateral movement based on the surrounding situation recognized by the recognition unit no matter the predetermined operation being over.

3. The control device according to claim 1,
wherein the travel control unit is further configured to notify the driver of an announcement in accordance with an operation situation related to the lane change, when the intention of the driver to change the lane is detected.

4. The control device according to claim 1,
wherein the operation device is a turn signal lever,
wherein positions at which the turn signal lever is movable include:
   a neutral position;
   a first position arranged in each of two directions different from each other with respect to the neutral position, wherein the turn signal lever positioned at the first position returns to the neutral position when no operation force is applied to the turn signal lever by the driver; and
   a second position arranged in each of two directions with respect to the neutral position, wherein a movement amount of the turn signal lever from the neutral position to the second position is larger than that from the neutral position to the first position, and wherein the turn signal lever positioned at the second position stays thereat when no operation force is applied to the turn signal lever by the driver, and
wherein the predetermined operation is an operation of keeping the turn signal lever at the first position.

5. The control device according to claim 4, further comprising:
   a control state setting unit configured to select and set an automation mode of a control of at least one of traveling speed and steering of the vehicle from a plurality of driving modes,
   wherein the plurality of driving modes include a first mode and a second mode in which a task imposed on the driver is slighter than in the first mode,
   wherein the travel control unit is configured not to accept an operation of keeping the turn signal lever at the first position when the second mode is set, and
   wherein the control state setting unit is implemented via at least one processor.

6. The control device according to claim 5,
wherein the first mode is an automation mode in which the driver needs to operate or grip a steering wheel of the vehicle, and
wherein the second mode is an automation mode in which the driver does not need to operate or grip the steering wheel.

* * * * *